United States Patent
Ninomiya et al.

(10) Patent No.: US 6,531,003 B2
(45) Date of Patent: Mar. 11, 2003

(54) ABRASION RESISTANT COPPER ALLOY, COPPER ALLOY POWDER FOR BUILD-UP CLADDING, AND ENGINE CYLINDER HEAD

(75) Inventors: Ryuji Ninomiya, Ageo (JP); Takeshi Ojiro, Ageo (JP); Koichi Miyake, Ageo (JP); Makoto Kano, Yokohama (JP); Kenji Tsushima, Yokohama (JP); Hidenobu Matsuyama, Yokohama (JP); Kenji Suzuki, Yokohama (JP)

(73) Assignees: Mitsui Mining & Smelting Co., Ltd., Tokyo (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/253,798

(22) Filed: Feb. 22, 1999

(65) Prior Publication Data

US 2001/0001641 A1 May 24, 2001

(30) Foreign Application Priority Data

Feb. 26, 1998 (JP) .......................... 10-045831
Jan. 29, 1999 (JP) .......................... 11-023277

(51) Int. Cl.$^7$ .............................. C22C 9/06
(52) U.S. Cl. .................. 148/435; 148/485; 420/486; 420/487; 420/488
(58) Field of Search .............. 148/435; 420/485, 420/486, 487, 488

(56) References Cited

U.S. PATENT DOCUMENTS 5,911,949 A * 6/1999 Ninomiya et al. .......... 420/487
6,096,142 A * 8/2000 Kano et al. ................ 148/436

FOREIGN PATENT DOCUMENTS

| EP | 0 320 195 A1 | 6/1989 |
| EP | 0 320 195 | 6/1989 |
| EP | 0 344 310 A1 | 12/1989 |
| EP | 0 344 310 | 12/1989 |
| EP | 0 411 882 A1 | 2/1991 |
| EP | 0 505 172 A1 | 3/1992 |
| EP | 0 727 501 A1 | 8/1996 |
| EP | 0 727 501 | 8/1996 |
| JP | 62202038 | * 9/1987 |
| JP | 2-179839 | 7/1990 |
| JP | 8-35027 | 2/1996 |
| JP | 8-283889 | 10/1996 |
| JP | 9-31571 | 2/1997 |

OTHER PUBLICATIONS

Atsushi; "High Strength and High Hardness Copper Alloy"; Patent Abstracts of Japan; vol. 97, No. 002; Feb. 28, 1997; & JP 08 283889; Oct. 29, 1996.

Akira; "Wear Resistant Copper Base Sintered Alloy"; Patent Abstracts of Japan; vol. 97, No. 006; Jun. 30, 1997; & JP 09 031571; Feb. 4, 1997.

Mamoru; "Copper Alloy Excellent in High Temperature Wear Resistance"; Patent Abstracts of Japan; vol. 96, No. 006; Jun. 28, 1996; & JP 08 035027; Feb. 6, 1996.

* cited by examiner

Primary Examiner—Sikyin Ip
(74) Attorney, Agent, or Firm—Foley & Lardner

(57) ABSTRACT

A valve seat (2) is formed by build-up cladding by irradiating a laser beam on a copper alloy powder (4) provided in the rim of a port (3) formed in an engine cylinder head (1). The copper alloy powder (4) consists of copper (Cu), 6–9 wt % nickel (Ni), 1–5 wt % silicon (Si), and 1–5 wt % of one of molybdenum (Mo), tungsten (W), tantalum (Ta), niobium (Nb) and vanadium (V). Due to this composition, the valve seat (2) has few microcracks and excellent abrasion resistance.

11 Claims, 1 Drawing Sheet

ABRASION RESISTANT COPPER ALLOY, COPPER ALLOY POWDER FOR BUILD-UP CLADDING, AND ENGINE CYLINDER HEAD

FIELD OF THE INVENTION

This invention relates to build-up cladding of a copper alloy for forming a valve seat in an engine cylinder head.

BACKGROUND OF THE INVENTION

A method of forming a valve seat for an engine intake valve or exhaust valve is known wherein copper. alloy powder is dissolved by a laser beam and accumulated on a cylinder head base metal along a rim of an intake port or exhaust port.

As an example of such a powdered copper alloy, Tokkai Hei 8-35027 published by the Japanese Patent Office in 1996 discloses a powder material comprising 10–30 wt % nickel (Ni), 0.5–5.0 wt % silicon (Si), and 2.0–15.0 wt % of at least one of molybdenum (Mo), tungsten (W), tantalum (Ta), niobium (Nb) and vanadium (V).

This powder material may also comprise 2.0–15.0 wt % iron (Fe) or 1.0–10.0 wt % chromium (Cr). It may also comprise 0.01–0.1% misch metal or 0.1–1.0 wt % phosphorus (P), 1.0–10.0 wt % manganese (Mn) and 0.5–3.0 wt % boron (B). The remaining components are copper (Cu) and impurities.

SUMMARY OF THE INVENTION

According to tests performed by the inventors, a valve seat formed using this powder material displayed superior in abrasion resistance, but microcracks occurred sporadically in the valve seat after cladding.

It is therefore an object of this invention to provide an abrasion resistant copper alloy in which microcracks rarely form.

It is a further object of this invention to improve the quality of an engine valve seat.

In order to achieve the above objects, this invention provides an abrasion resistant copper alloy consisting of copper (Cu). 6–9 wt % nickel (Ni), 1–5 wt % silicon (Si), and 1–5 wt % of a material selected from the group consisting of molybdenum (Mo), tungsten (W), tantalum (Ta), niobium (Nb) and vanadium (V).

This invention also provides an abrasion resistant copper alloy consisting of copper (Cu). 6–9 wt % nickel (Ni), 1–5 wt % silicon (Si), 0.5–1.5 wt % iron (Fe), and 1–5 wt % of a material selected from the group consisting of molybdenum (Mo), tungsten (W), tantalum (Ta), niobium (Nb) and vanadium (V).

This invention also provides an abrasion resistant copper alloy consisting of copper (Cu). 6–9 wt % nickel (Ni), 1–5 wt % silicon (Si), 0.5–1.5 wt % iron (Fe), 1–5 wt % chromium (Cr), and 1–5 wt % of a material selected from the group consisting of molybdenum (Mo), tungsten (W), tantalum (Ta), niobium (Nb) and vanadium (V).

This invention also provides an abrasion resistant copper alloy consisting of copper (Cu). 6–9 wt % nickel (Ni), 1–5 wt % silicon (Si), 1–5 wt % chromium (Cr), 0.5–0.9 wt % aluminum (Al), and 1–5 wt % of a material selected from the group consisting of molybdenum (Mo), tungsten (W), tantalum (Ta), niobium (Nb) and vanadium (V).

This invention also provides an abrasion resistant copper alloy consisting of copper (Cu), 6–9 wt % nickel (Ni), 1–5 wt % silicon (Si), 0.5–1.5 wt % iron (Fe), 0.5–0.9 wt % aluminum (Al), 5–15 wt % cobalt (Co), and 1–5 wt % of a material selected from the group consisting of molybdenum (Mo), tungsten (W), tantalum (Ta), niobium (Nb) and vanadium (V).

This invention also provides an abrasion resistant copper alloy consisting of copper (Cu), 6–9 wt % nickel (Ni), 1–5 wt % silicon (Si), 0.5–1.5 wt % iron (Fe), 0.1–1.0 wt % phosphorus (P), and 1–5 wt % of a material selected from the group consisting of molybdenum (Mo), tungsten (W), tantalum (Ta), niobium (Nb) and vanadium (V).

This invention also provides an abrasion resistant copper alloy consisting of copper (Cu), 6–9 wt % nickel (Ni), 1–5 wt % silicon (Si), 0.5–1.5 wt % iron (Fe), 1–5 wt % chromium (Cr), 0.1–1.0 wt % phosphorus (P), 1–10 wt % manganese (Mn), and 1–5 wt % of a material selected from the group consisting of molybdenum (Mo), tungsten (W), tantalum (Ta), niobium (Nb) and vanadium (V).

This invention also provides an abrasion resistant copper alloy consisting of copper (Cu), 6–9 wt % nickel (Ni), 1–5 wt % silicon (Si), 0.5–1.5 wt % iron (Fe), 1–5 wt % chromium (Cr), 0.5–0.9 wt % aluminum (Al), 0.1–1.0 wt % phosphorus (P), 1–10 wt % manganese (Mn), 0.01–0.1 wt % rare earth metal, and 1–5 wt % of a material selected from the group consisting of molybdenum (Mo), tungsten (W), tantalum (Ta), niobium (Nb) and vanadium (V).

This invention also provides an abrasion resistant copper alloy consisting of copper (Cu), 9–15 wt % nickel (Ni), 1–5 wt % silicon (Si), 0.5–1.5 wt % iron (Fe), 1–5 wt % chromium (Cr), 0.5–0.9 wt % aluminum (Al), 0.1–1.0 wt % phosphorus (P), and 1–5 wt % of a material selected from the group consisting of molybdenum (Mo), tungsten (W), tantalum (Ta), niobium (Nb) and vanadium (V).

This invention also provides an abrasion resistant copper alloy consisting of copper (Cu), 9–15 wt % nickel (Ni), 1–5 wt % silicon (Si), 0.5–1.5 wt % iron (Fe), 1–5 wt % chromium (Cr), 0.5–0.9 wt % aluminum (Al), 0.1–1.0 wt % phosphorus (P), 1–10 wt % manganese (Mn), and 1–5 wt % of a material selected from the group consisting of molybdenum (Mo), tungsten (W), tantalum (Ta), niobium (Nb) and vanadium (V).

This invention also provides an abrasion resistant copper alloy consisting of copper (Cu), 9–15 wt % nickel (Ni), 1–5 wt % silicon (Si), 0.5–1.5 wt % iron (Fe), 1–5 wt % chromium (Cr), 0.5–0.9 wt % aluminum (Al), 0.1–1.0 wt % phosphorus (P), 1–10 wt % manganese (Mn), 0.01–0.1 wt % rare earth metal, and 1–5 wt % of a material selected from the group consisting of molybdenum (Mo), tungsten (W), tantalum (Ta), niobium (Nb) and vanadium (V).

The above copper alloys are preferably provided in the form of powder for build-up cladding using a laser beam.

Such build-up cladding is preferably used for forming a valve seat of intake and exhaust valves arranged in an engine cylinder head.

The details as well as other features and advantages of this invention are set forth in the remainder of the specification and are shown in the accompanying drawings.

DESCRIPTION OF THE PREFERRED EMBODIMENTS

Figure 1:
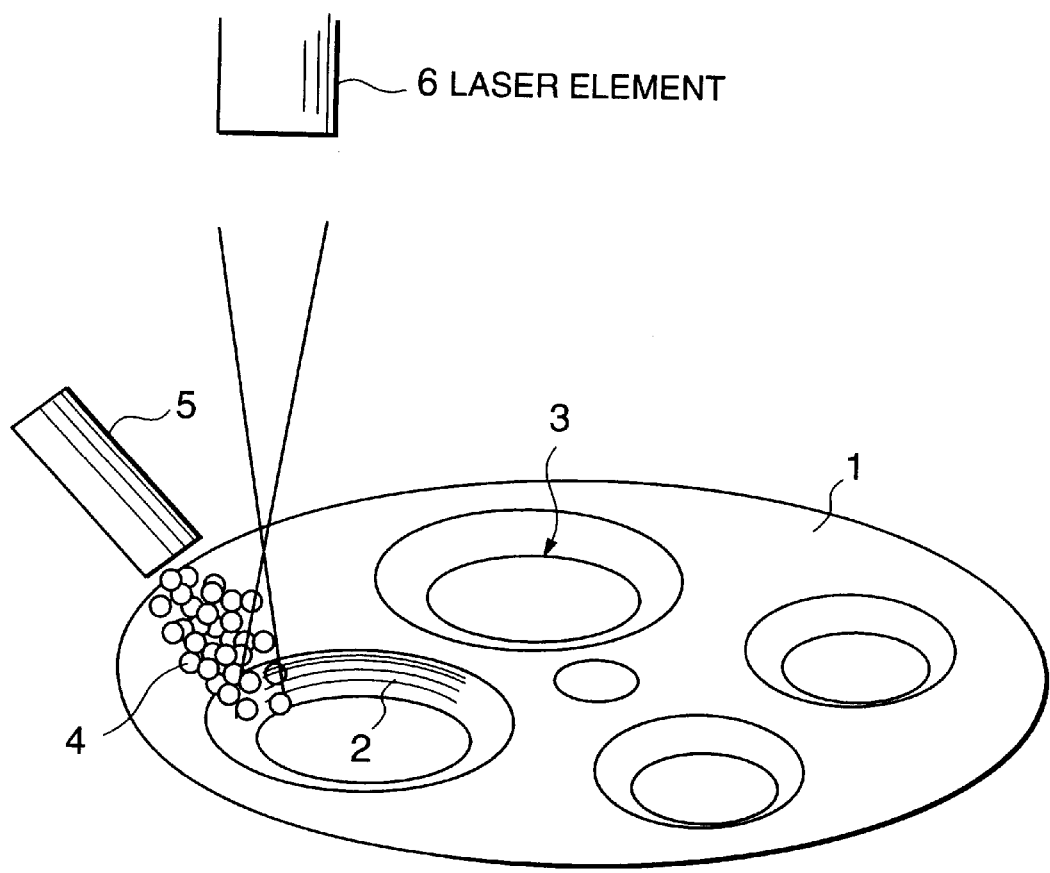
FIG. 1 is a perspective view of a valve seat portion of an engine cylinder head according to this invention.

Referring to FIG. 1 of the drawings, a valve seat 2 for an intake valve and exhaust valve are formed in an engine cylinder head 1. The valve seat 2 is formed by build-up cladding of copper alloy powder 4 having the composition of Samples #1–#15 in Table 1 in the rim of a port 3 in the base material of the precast cylinder head 1.

Copper alloy powder 4 is supplied to the rim of the port 3 from a powder feed nozzle 5.

The building of copper alloy is formed with a thickness of 3 mm or more on the rim of the hole 3 by irradiating this powder by a laser beam from a carbon dioxide laser element 6 under the following conditions.

Laser output=5.0 kW

Working speed=1.0 m/min

Shielding gas=Ar gas

Shielding gas flow rate=20 liter/min

The base metal of the cylinder head 1 is cast in Al-Cu-Mg type alloy specified by AC2A, which is an aluminum casting alloy specified by JIS-H-5202. This cylinder head 1 is for an in-line type four-cylinder double overhead cam (DOHC) engine, and comprises four holes 3 for intake valves and exhaust valves in each cylinder.

The copper alloy powder 4 is formed as follows. First, molten copper alloy corresponding to one of Samples #1–#15 which is a copper alloy according to this invention shown in Table 2 (appended to the end of this Specification), is prepared in a graphite pot of a high frequency induction furnace. Next, the molten copper alloy is allowed to flow down from the bottom of the pot, and "gas atomization" is performed wherein a gas is blown into the molten copper alloy which is flowing down to pulverize the alloy to a powder. Dehydration, degassing and particle grading is then performed to obtain a cladding powder.

A common feature of the copper alloy powders shown in Samples #1–#15 of Table 1 is that they comprise 6–15 wt % nickel (Ni), 1–5 wt % silicon (Si), and 1–5 wt % of at least one of molybdenum (Mo), tungsten (W), tantalum (Ta), niobium (Nb) and vanadium (V).

Nickel (Ni) is a useful element for improving the abrasion resistance of the valve seat 2.

By suppressing nickel (Ni) to 9 wt % or less, microcracks formed sporadically in the cladding layer can be reduced.

When the content of nickel (Ni) is higher than 9 wt %, the number of microcracks increases, but by further adding phosphorus (P) or manganese (Mn), 9–15 wt % of nickel (Ni) may improve the abrasion resistance of the alloy while suppressing the number of microcracks to within an acceptable range as shown by Samples #13–#15. Nickel (Ni) or silicon (Si) cause deposition of hard silicides, but when nickel (Ni) is less than 6 wt %, deposition of hard silicides is reduced and high abrasion resistance is no longer obtained.

Silicon (Si) is required for deposition of hard silicides and is useful for improving the abrasion resistance of the valve seat 2. When the silicon (Si) content is less than 1 wt %, the deposition amount of hard suicides decreases, but if the content exceeds 5 wt %, abrasion resistance does not greatly improve and microcracks actually tend to form more easily.

By adding 0.5–1.5 wt % of iron (Fe) or 1–5 wt % chromium (Cr), abrasion resistance can be improved as shown by Samples #4–#15 of Table 1. Both of these raise room temperature hardness and high temperature hardness of the cladding of a valve seat. When the addition amount is less than the lower limits mentioned above, a marked effect cannot be obtained from either iron (Fe) or chromium (Cr). However, when the upper limits are exceeded, there is not much improvement of hardness while microcracks form easily.

When 0.5–0.9 wt % of aluminum (Al) is added, room temperature hardness is enhanced and an improvement of abrasion resistance is obtained as shown by Samples #6, #7, and #12–#15.

However, when aluminum (Al) is less than 0.5 wt %, the effect is small. When 0.9 wt % is exceeded, room temperature hardness decreases and microcracks form easily.

When 5–15 wt % of cobalt (Co) is added, lumps of hard silicides are deposited and room temperature hardness is mainly enhanced as shown by Samples #7 and #10–#12. This is effective for abrasion resistance improvement of a valve seat of the exhaust valve. However, when the cobalt (Co) content is less than 5 wt % the effect is small, and when it exceeds 15 wt %, microcracks form easily.

When 0.1–1.0 wt % of phosphorus (P) is added, the viscosity decreases when the powder melts as shown by Samples #8–#15, so lumps of hard silicides are uniformly deposited when the cladding is formed by irradiation with the laser beam, and the formation of microcracks is suppressed. However, when the phosphorus (P) content is less than 0.1 wt % the effect is small, and when it exceeds 1.0 wt %, no further advantage is obtained.

When 1.0–10.0 wt % manganese (Mn) is added, the formation of microcracks is suppressed as shown by Samples #9–#12, #14 and #15. However, when the manganese (Mn) content is less than 1 wt % the effect is small, and when it exceeds 10 wt %, no further advantage is obtained.

When 0.01–0.1 wt % of rare earth metals (REM) comprising misch metal is added, the formation of microcracks is suppressed as shown by Samples #10–#12 and #15. However, when the rare earth metal (REM) content is less than 0.01 wt % the effect is small, and when it exceeds 0.1 wt %, no further advantage is obtained.

The remaining components of Samples #1–#15 of Table 1 are copper (Cu) and impurities.

The inventors prepared 100 of the cylinder heads 1 for each Sample, and performed a build-up cladding in sixteen ports 3 in each of the cylinder heads 1.

Build-up cladding was performed also using Comparative Samples #1–#12 which are not according to this invention and which have the compositions shown in Table 2.

Comparative Sample #11 corresponds to the copper alloy disclosed in the aforesaid prior art Tokkai Hei 8-35027.

Comparative Samples #1–#10 and #12 were arranged by the inventors for purposes of comparison, and do not necessarily conform to the prior art.

The remainder of the compositions of Comparative Samples #1–#12 of Table 2 also comprises copper (Cu) and impurities.

The cylinder head 1 obtained by the above process was finished to predetermined dimensions and surface roughness via mechanical machining.

Twenty of the cylinder heads 1 which respectively have sixteen valve seats thus formed using the same powder were selected corresponding to each of the above Samples and Comparative Samples, and the number of microcracks was examined by performing a color check on the cladding layer of 320 of the holes 3 in total for each case.

The results are shown in Tables 3 and 4.

The Vickers' hardness of the cladding, which has a significant correlation with the abrasion resistance of the valve seat formed, was measured at room temperature and at a high temperature of 400° C.

As for Samples #1–#3 and Comparative Samples #1–#4 which have a Vickers' hardness less than Hv 150, the cladding was performed only in the valve seat of the intake valve.

The measurement results are shown in Tables 3 and 4.

For each Sample and Comparative Sample, cylinder heads for which microcracks had not been found were subjected to the following engine test.

Engine=1998 cc in-line type four cylinder DOHC engine

Fuel=regular clear gasoline

Engine rotation speed=6,000 rpm

Intake valve material=heat-resistant steel corresponding to JIS SUH11

Exhaust valve material=heat-resistant steel corresponding to JIS SUH36

Engine load (throttle opening)=4/4

Test time=100 hours

After the test, the abrasion depth of the valve seat and valve face were measured.

The measurement results are shown in Tables 3 and 4.

From the test results, the number of valve seats with microcracks decreased for Samples #1–#15 according to this invention compared to Comparative Samples #1–#12.

The depth of abrasion of the valve seat and valve face after the engine test was also less for Samples #1–#15 according to this invention than for Comparative Samples #1–#12.

For a valve seat formed using Samples #1–#15, the external appearance of the frictional sliding parts was almost smooth, and no abrasion defects or pits which would cause loss of sealtightness of the valve seat were observed.

On the other hand for Comparative Sample #1 wherein the nickel (Ni) content was less than 6 wt %, the hardness Hv200 at room temperature was extremely low, and the abrasion depth of the valve seat was very high as the abrasion resistance was incomplete.

The abrasion depth of the valve face was also large due to repeated sticking and peeling of the abrasive powder on the valve face.

In a valve seat according to Comparative Sample #2 wherein the nickel (Ni) content was 10 wt % or more and neither of phosphorus (P) nor manganese (Mn) were present, there were a large number of microcracks and the abrasion depths of the valve seat and valve face due to the test were high. Further, in a valve seat according to Comparative Sample #12 wherein phosphorus (P) and manganese (Mn) are added, but the nickel (Ni) content exceeds 15 wt %, high abrasion resistance was obtained, but a considerable number of the valve seats had microcracks.

For a valve seat according to Comparative Sample #3 wherein the molybdenum (Mo) and tungsten (W) content was less than 1 wt %, there was little deposition of hard suicides and adequate abrasion resistance was not obtained. This valve seat therefore had a large abrasion depth, and a ring-shaped groove was formed in the valve seat. The abrasion depth of the corresponding valve face was also large.

For a valve seat according to Comparative Sample #4 wherein the total amount of molybdenum (Mo), tungsten (W), tantalum (Ta), niobium (Nb) and vanadium (V) exceeded 5%, there were a large number of microcracks as in the case of the valve seat according to Comparative Sample 2. Although engine tests were performed using cylinder heads wherein microcracks had not been detected, the abrasion depth of the valve seat and valve face due to the test was high.

For a valve seat according to Comparative Sample 5 wherein the iron (Fe) content exceeded 1.5% and the chromium (Cr) content exceeded 5%, the abrasion depth of the valve seat was large as in the case of valve seats according to Comparative Samples #2 and #4.

It appears that a high iron (Fe) or chromium (Cr) content is not effective in improving hardness and abrasion resistance.

For a valve seat according to Comparative Sample #6 wherein the aluminum (Al) content exceeded 0.9%, the same result was obtained as for valve seats according to Comparative Samples #2 and #4.

The number of microcracks was highest for this Comparative Sample #6. For the valve seat according to Comparative Sample #6, the high temperature hardness fell considerably compared to the room temperature hardness, as shown in Table 4. Therefore, the abrasion depth of the valve seat and valve face of the exhaust valve which reaches a high temperature, was fairly large.

For a valve seat according to Comparative Sample #7 wherein the cobalt (Co) content exceeded 15%, the same characteristics were obtained as for a valve seat according to Comparative Samples #2, #4, #5 and #6.

Comparative Sample #8 was a copper alloy powder wherein the nickel (Ni), silicon (Si), molybdenum (Mo), iron (Fe) and chromium (Cr) content was that of the copper alloy according to this invention, to which less than 0.1% phosphorus (P), less than 1% manganese (Mn) and less than 0.01% rare earths (REM) had been added.

In a valve seat formed using this copper alloy powder, there was no particular decline of abrasion resistance, but there were numerous microcracks.

For a valve seat according to Comparative Sample #9 having an identical composition to that of Comparative Sample #8 wherein the phosphorus (P) content had been increased to more than 1.0 wt %, there were few microcracks but the abrasion resistance was not high enough.

For a valve seat according to Comparative Sample 10 having an identical composition to that of Comparative Sample 8 wherein the manganese (Mn) content had been increased to more than 1.0 wt %, there was also no great improvement compared to Comparative Sample 8.

For a valve seat according to Comparative Sample 11 corresponding to the copper alloy disclosed in Tokkai Hei 8-35027 of the aforementioned prior art, there were a considerable number of microcracks.

Therefore, in a valve seat formed with the copper alloy of Samples #1–#15 according to the present invention, excellent quality is obtained both in terms of the number of microcracks and the abrasion depth.

The contents of Tokugan Hei 10-45831 with a filing date of Feb. 26, 1998 in Japan and Tokugan Hei 11-23277 with a filing date of Jan. 29, 1999 in Japan are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

TABLE 1

| SAMPLES | CHEMICAL COMPONENT (WEIGHT %) | | | | | | | | | | | | |
|---|---|---|---|---|---|---|---|---|---|---|---|---|---|
| | Ni | Si | Mo | W | Ta | Nb | V | Fe | Cr | Al | Co | P | Mn | REM |
| #1 | 6.1 | 4.8 | 4.5 | — | — | — | — | — | — | — | — | — | — | — |
| #2 | 7.4 | 2.5 | 2.0 | 3.0 | — | — | — | — | — | — | — | — | — | — |
| #3 | 8.2 | 3.3 | — | 2.5 | 2.4 | — | — | — | — | — | — | — | — | — |
| #4 | 8.9 | 2.6 | — | — | 0.4 | 0.6 | 2.0 | 1.5 | — | — | — | — | — | — |
| #5 | 9.0 | 2.4 | — | — | 0.8 | 1.5 | 0.5 | 1.3 | 2.5 | — | — | — | — | — |
| #6 | 8.5 | 2.7 | — | 1.5 | — | 1.5 | 0.7 | — | 4.4 | 0.9 | — | — | — | — |
| #7 | 9.0 | 2.6 | — | — | — | 1.9 | 2.2 | 1.5 | — | 0.5 | 10.2 | — | — | — |
| #8 | 6.8 | 2.5 | 1.2 | — | 1.3 | 1.8 | — | 1.2 | — | — | — | 0.12 | — | — |
| #9 | 7.7 | 2.4 | 1.4 | 1.2 | — | 1.3 | 1.1 | 0.5 | 4.8 | — | — | 0.22 | 1.2 | — |
| #10 | 6.4 | 1.4 | 1.2 | 1.3 | 1.1 | — | 1.4 | 1.2 | 1.0 | 0.8 | 5.4 | 0.96 | 2.2 | 0.08 |
| #11 | 6.3 | 2.6 | 2.1 | 1.2 | 1.0 | — | 0.7 | 1.4 | 4.6 | 0.6 | 14.5 | 0.97 | 5.4 | 0.08 |
| #12 | 7.4 | 2.8 | 1.5 | 0.5 | 1.2 | 1.4 | 0.4 | 1.1 | 5.0 | 0.7 | 8.2 | 0.95 | 9.5 | 0.07 |
| #13 | 12.1 | 2.8 | — | — | — | 0.5 | 1.5 | 1.2 | 1.9 | 0.9 | — | 0.5 | — | — |
| #14 | 13.7 | 3.1 | — | — | — | — | 2.1 | 1.1 | 2.0 | 0.8 | — | 0.4 | 3.5 | — |
| #15 | 15 | 3.0 | — | — | — | — | 2.5 | 1.0 | 1.8 | 0.8 | — | 0.8 | 2.5 | 0.08 |

REMARKS: LANTHANUM(La) IS USED AS RARE EARTH METAL (REM)

TABLE 2

| COMPARATIVE SAMPLES | CHEMICAL COMPONENT (WEIGHT %) | | | | | | | | | | | | |
|---|---|---|---|---|---|---|---|---|---|---|---|---|---|
| | Ni | Si | Mo | W | Ta | Nb | V | Fe | Cr | Al | Co | P | Mn | REM |
| #1 | 5.3 | 0.9 | 1.3 | — | — | 1.4 | — | — | — | — | — | — | — | — |
| #2 | 10.3 | 2.6 | 2.4 | — | — | 1.3 | — | — | — | — | — | — | — | — |
| #3 | 7.6 | 2.6 | 0.2 | 0.2 | — | — | — | — | — | — | — | — | — | — |
| #4 | 8.8 | 5.6 | 0.7 | 1.5 | 2.5 | 1.6 | 0.3 | — | — | — | — | — | — | — |
| #5 | 9.3 | 2.5 | 1.5 | — | — | — | — | 2.1 | 6.4 | — | — | — | — | — |
| #6 | 8.2 | 2.4 | 1.3 | 1.4 | — | 0.5 | — | 1.4 | 4.2 | 1.3 | — | — | — | — |
| #7 | 7.8 | 2.6 | 1.2 | 2.5 | — | — | — | 1.5 | 4.4 | 0.7 | 16.4 | — | — | — |
| #8 | 11.0 | 2.4 | 4.1 | — | — | — | — | 1.4 | 3.2 | — | — | 0.04 | 0.3 | 0 |
| #9 | 10.2 | 5.5 | 4.0 | 2.1 | — | — | — | 1.3 | 4.4 | — | — | 1.97 | 10.3 | 0.08 |
| #10 | 9.3 | 2.6 | 3.5 | — | — | — | — | 0.7 | 4.5 | — | — | 0.8 | 11.4 | 0.18 |
| #11 | 12.2 | 3.2 | — | — | — | 1.5 | — | — | — | 1.2 | 10.5 | — | — | — |
| #12 | 16.2 | 3.1 | — | — | — | — | 2.8 | 1.2 | 2.0 | 0.9 | — | 0.9 | 3.6 | 0.07 |

REMARKS: LANTHANUM(La) IS USED AS RARE EARTH METAL (REM)

TABLE 3

| SAMPLES | NOS. OF VALVE SHEETS WITH CRACKS | VICKERS' HARDNESS (Hv) | | ABRASION DEPTH | | | |
|---|---|---|---|---|---|---|---|
| | | ROOM TEMP. | 400 Å é | INTAKE VALVE | | EXAUST VALVE | |
| | | | | VALVE SHEET | VALVE FACE | VALVE SHEET | VALVE FACE |
| #2 | 5 | 237 | 136 | 31 | 25 | — | — |
| #2 | 8 | 244 | 128 | 28 | 28 | — | — |
| #7 | 10 | 287 | 254 | 17 | 18 | 18 | 15 |
| #2 | 0 | 253 | 190 | 25 | 27 | 45 | 27 |
| #2 | 0 | 259 | 203 | 21 | 26 | 39 | 36 |
| #10 | 9 | 305 | 247 | 10 | 24 | 17 | 18 |
| #11 | 6 | 288 | 258 | 16 | 16 | 14 | 14 |
| #12 | 8 | 299 | 251 | 15 | 20 | 15 | 14 |
| #13 | 15 | 285 | 239 | 12 | 18 | 12 | 14 |
| #14 | 17 | 292 | 245 | 8 | 12 | 9 | 11 |
| #15 | 18 | 298 | 251 | 8 | 10 | 8 | 13 |

TABLE 4

| COMPARATIVE SAMPLES | NOS. OF VALVE SHEETS WITH CRACKS | VICKERS' HARDNESS (Hv) ROOM TEMP. | 400 Åé | ABRASION DEPTH | | | |
|---|---|---|---|---|---|---|---|
| | | | | INTAKE VALVE | | EXAUST VALVE | |
| | | | | VALVE SHEET | VALVE FACE | VALVE SHEET | VALVE FACE |
| #1 | 2 | 188 | 103 | 96 | 68 | — | — |
| #2 | 75 | 241 | 142 | 33 | 42 | — | — |
| #3 | 5 | 191 | 130 | 79 | 57 | — | — |
| #4 | 88 | 254 | 145 | 38 | 35 | — | — |
| #5 | 84 | 268 | 218 | 24 | 20 | 37 | 30 |
| #6 | 98 | 310 | 197 | 32 | 40 | 60 | 72 |
| #7 | 72 | 286 | 266 | 35 | 37 | 48 | 58 |
| #8 | 69 | 262 | 213 | 38 | 39 | 52 | 61 |
| #9 | 16 | 273 | 229 | 39 | 48 | 44 | 55 |
| #10 | 48 | 258 | 201 | 37 | 44 | 43 | 54 |
| #11 | 94 | 277 | 208 | 45 | 43 | 49 | 56 |
| #12 | 36 | 305 | 268 | 7 | 10 | 7 | 12 |

What is claimed is:

1. An abrasion resistant build-up cladding copper alloy consisting of:
   9–15 wt % nickel (Ni);
   1–5 wt % silicon (Si);
   1–5 wt % of a material selected from the group consisting of molybdenum (Mo), tungsten (W), tantalum (Ta), niobium (Nb) and vanadium (V);
   0.5–1.5 wt % iron (Fe);
   1–5 wt % chromium (Cr);
   0.5–0.9 wt % aluminum (Al);
   0.1–1.0 wt % phosphorus (P); and
   copper (Cu).

2. The abrasion resistant build-up cladding copper alloy as defined in claim 1, wherein the alloy is in the form of a powder.

3. An abrasion resistant copper alloy for build-up cladding consisting of:
   6–9 wt % nickel (Ni);
   1–5 wt % silicon (Si);
   1–5 wt % of a material selected from the group consisting of molybdenum (Mo), tungsten (W), tantalum (Ta), niobium (Nb) and vanadium (V); and
   copper (Cu).

4. An abrasion resistant build-up cladding copper alloy consisting of:
   6–9 wt % nickel (Ni);
   1–5 wt % silicon (Si);
   1–5 wt % of a material selected from the group consisting of molybdenum (Mo), tungsten (W), tantalum (Ta), niobium (Nb) and vanadium (V);
   0.5–1.5 wt % iron (Fe); and
   copper (Cu).

5. An abrasion resistant build-up cladding copper alloy consisting of:
   6–9 wt % nickel (Ni);
   1–5 wt % silicon (Si);
   1–5 wt % of a material selected from the group consisting of molybdenum (Mo), tungsten (W), tantalum (Ta), niobium (Nb) and vanadium (V);
   0.5–1.5 wt % iron (Fe);
   1–5 wt % chromium (Cr); and
   copper (Cu).

6. An abrasion resistant build-up cladding copper alloy consisting of:
   6–9 wt % nickel (Ni);
   1–5 wt % silicon (Si);
   1–5 wt % of a material selected from the group consisting of molybdenum (Mo), tungsten (W), tantalum (Ta), niobium (Nb) and vanadium (V);
   1–5 wt % chromium (Cr);
   0.5–0.9 wt % aluminum (Al); and
   copper (Cu).

7. An abrasion resistant build-up cladding copper alloy consisting of:
   6–9 wt % nickel (Ni);
   1–5 wt % silicon (Si);
   1–5 wt % of a material selected from the group consisting of molybdenum (Mo), tungsten (W), tantalum (Ta), niobium (Nb) and vanadium (V);
   0.5–1.5 wt % iron (Fe);
   0.5–0.9 wt % aluminum (Al);
   5–15 wt % cobalt (Co); and
   copper (Cu).

8. An abrasion resistant build-up cladding copper alloy consisting of:
   6–9 wt % nickel (Ni);
   1–5 wt % silicon (Si);
   1–5 wt % of a material selected from the group consisting of molybdenum (Mo), tungsten (W), tantalum (Ta), niobium (Nb) and vanadium (V);
   0.5–1.5 wt % iron (Fe);
   0.1–1.0 wt % phosphorus (P); and
   copper (Cu).

9. An abrasion resistant build-up cladding copper alloy consisting of:
   9–15 wt % nickel (Ni);
   1–5 wt % silicon (Si);
   1–5 wt % of a material selected from the group consisting of molybdenum (Mo), tungsten (W), tantalum (Ta), niobium (Nb) and vanadium (V);
   0.5–1.5 wt % iron (Fe);
   1–5 wt % chromium (Cr);
   0.5–0.9 wt % aluminum (Al);

0.1–1.0 wt % phosphorus (P);
1–10 wt % manganese (Mn); and
copper (Cu).

10. An abrasion resistant build-up cladding copper alloy consisting of:
- 9–15 wt % nickel (Ni);
- 1–5 wt % silicon (Si);
- 1–5 wt % of a material selected from the group consisting of molybdenum (Mo), tungsten (W), tantalum (Ta), niobium (Nb) and vanadium (V);
- 0.5–1.5 wt % iron (Fe);
- 1–5 wt % chromium (Cr);
- 0.5–0.9 wt % aluminum (Al);
- 0.1–1.0 wt % phosphorus (P);
- 1–10 wt % manganese (Mn);
- 0.01–0.1 wt % rare earth metal; and
- copper (Cu).

11. A valve seat formed by build-up cladding of an abrasion resistant build-up cladding copper alloy consisting of:
- 9–15 wt % nickel (Ni);
- 1–5 wt % silicon (Si);
- 1–5 wt % of a material selected from the group consisting of molybdenum (Mo), tungsten (W), tantalum (Ta), niobium (Nb) and vanadium (V);
- 0.5–1.5 wt % iron (Fe);
- 1–5 wt % chromium (Cr);
- 0.5–0.9 wt % aluminum (Al);
- 0.1–1.0 wt % phosphorus (P); and
- copper (Cu).

\* \* \* \* \*